US005773944A

United States Patent [19]
Courault

[11] Patent Number: 5,773,944
[45] Date of Patent: Jun. 30, 1998

[54] ELECTRIC MACHINE CONTROL SYSTEM INCLUDING A TORQUE SMOOTHING DEVICE

[75] Inventor: Jacques Courault, Veneux Les Sablons, France

[73] Assignee: Cegelec, Levallois Perret, France

[21] Appl. No.: 766,463

[22] Filed: Dec. 12, 1996

[30] Foreign Application Priority Data

Dec. 14, 1995 [FR] France .................. 95 14 865

[51] Int. Cl.⁶ ..................................... H02P 7/00
[52] U.S. Cl. .................. 318/432; 318/254; 318/138; 318/439; 318/434; 318/798; 318/815
[58] Field of Search .................. 318/254, 138, 318/439, 432, 434, 798–815

[56] References Cited

U.S. PATENT DOCUMENTS

| | | |
|---|---|---|
| 4,868,477 | 9/1989 | Anderson et al. .................. 318/254 X |
| 5,227,703 | 7/1993 | Boothe et al. . | 
| 5,352,963 | 10/1994 | Garand et al. ...................... 318/252 X |

FOREIGN PATENT DOCUMENTS

0267548A2  5/1988  European Pat. Off. .

WO9418683  8/1994  WIPO .

OTHER PUBLICATIONS

A. H. Samara et a, "Current Injection Method to Eliminate Harmonics in AC Power Systems", *Conf. Record Industrial and Commerical Power Systems,* May 2–6, 1993, St. Petersburg, US, pp. 85–91.

A. D. Crane, "The Control of Machine Current Harmonics in Load Commutated Inverter Induction Motor Drives", *Fifth European Conf. on Power Electronics and Applications,* vol. 6, No. II, 13–16 Sep., 1993, Brighton, United Kingdom, pp. 133–138.

*Primary Examiner*—Karen Masih
*Attorney, Agent, or Firm*—Sughrue, Mion, Zinn, Macpeak & Seas, PLLC

[57] ABSTRACT

An electric machine control system includes a torque smoothing device including a torque monitoring device connected to the electric machine and supplying torque signals. A smoothing processor receives the torque signals and receives at least one torque reference signal and produces torque smoothing signals. A smoothing generator receives the smoothing signals and supplies smoothing electric power to the machine to make its torque conform to the torque reference.

17 Claims, 3 Drawing Sheets

ELECTRIC MACHINE CONTROL SYSTEM INCLUDING A TORQUE SMOOTHING DEVICE

BACKGROUND OF THE INVENTION

1. Field of the Invention

The present invention concerns a torque smoothing device and an electric machine control system including a torque smoothing device of this kind.

2. Description of the Prior Art

It is common to seek to smooth the torque of an electric machine such as a motor driving an iron and steel installation or a railroad traction or marine propulsion drive motor. The aim is to avoid vibration that can reduce the efficiency and the service life of the electric machine and the installation that it drives. Smoothing is usually effected by action on the power supply device, which is a power supply converter, in order to modify the waveform of the currents and/or voltages that it supplies to the machine, in particular by reducing the amplitude of harmonics. One example is described in European patent 0 267 548.

Apart from yielding imperfect results, these prior art solutions require adaptations of the power supply converters that compromise their inherent efficiency, with the result that they are not usable in practise for high power machines.

An aim of the present invention is to provide a solution that does not suffer from these drawbacks and limitations.

SUMMARY OF THE INVENTION

The present invention is directed to an electric machine control system fed by a power supply device and including a torque smoothing device. The system further includes a monitor connected to the electric machine for supplying torque signals, A smoothing processor receives the torque signals and compares the torque signals to at least one torque reference signal having a value corresponding to constant machine torque and minimal machine vibration. The processor produces torque smoothing signals received by a smoothing generator fed in parallel to a primary electric power supply to the electric machine which supplies separate modulating electric power to the machine to make its torque conform to the torque reference value.

Thus the torque smoothing function is separated from the supply of power to the machine. Each can be separately optimized. Further, the objectives of the torque smoothing function can be wider than power supply control.

The smoothing generator is advantageously a power supply converter. Varied current/voltage waveforms can be obtained from prior art power supply converters. When it is a question merely of topping off or smoothing the power supplied to the machine, merely to smooth the torque, the converter can have a lower power rating than the power supply device.

The output of the smoothing generator is preferably connected in parallel to at least one power supply circuit of the machine. The top-off power for torque smoothing is then supplied to the machine without any modification of the latter or its power supply circuit.

Additionally, however, an inductor is placed in series with the power supply circuit, on the upstream side of said parallel connection, to limit the load on the smoothing generator represented by the output of the power supply device.

Additionally, a capacitor is connected in parallel with the input of the machine; it filters both the power supply of the machine and the smoothing of the smoothing generator power.

In one embodiment the torque monitor detects the current and the voltage supplied to the machine. The frequencies, phases and amplitudes enable calculation of the torque generated in the machine and, consequently, any correction that may be required. When the smoothing power has been evaluated, it is sufficient to vary it so that such corrections are minimal.

In a different embodiment, the torque monitor comprise sensors associated with the machine. These sensors, for example strain gauges at the machine fixings, provide an instantaneous evaluation of the torque through the forces acting on and the vibration of the stator.

Finally, if the machine has a plurality of power supply circuits, the device is advantageously adapted to observe them all, but to supply the smoothing power to only one of them.

The various objects and features of the invention are described in detail in the following description of one embodiment of the invention given by way of non-limiting example and with reference to the accompanying drawings.

DETAILED DESCRIPTION OF THE PREFERRED EMBODIMENTS

Figure 1:
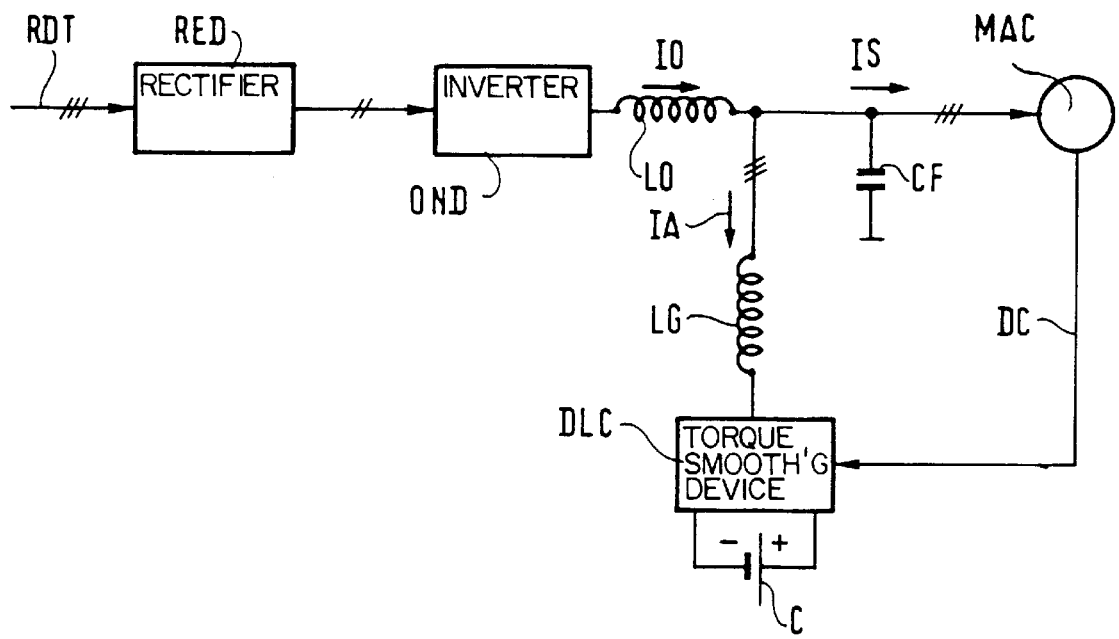
FIG. 1 is a block schematic of an electric machine control system of the present invention.

Refer firstly to FIG. 1. It shows a connection RDT to a distribution network, a rectifier RED, an inverter OND, an inductor LO, an electric machine MAC, a direct current supply C, a smoothing device DLC and a filter capacitor CF.

The three-phase connection RDT feeds the rectifier RED which provides a direct current supply via a two-wire connection to the converter OND which produces a three-phase current IO flowing through the inductor LO to power the machine MAC. An arrangement of this kind is conventional. The RED-OND combination can be optimized to suit the requirements of the machine MAC. The latter may be a rolling mill, locomotive or ship motor.

It is generally desirable for the torque to change progressively and smoothly at all speeds, so that the machine is free of potentially harmful vibrations, all the more so at lower speeds. At lower speeds the inherent vibrations of the rolling mill, locomotive or ship propulsion system no longer mask those of the machine, as at higher speeds. Moreover, at some lower speeds the machine may excite mechanical resonances.

For the above reasons the invention provides a smoothing device DLC connected to a power supply SC and adapted to monitor the torque generated by the machine MAC, via a connection DC, to process the torque signals obtained in this way relative to certain internal torque references and to produce internal torque smoothing signals on the basis of which a top-off or smoothing power is generated, in the form of a current IA flowing through a smoothing inductor LG and added to the current IO to constitute the current IS supplied to the machine MAC.

Figure 3:
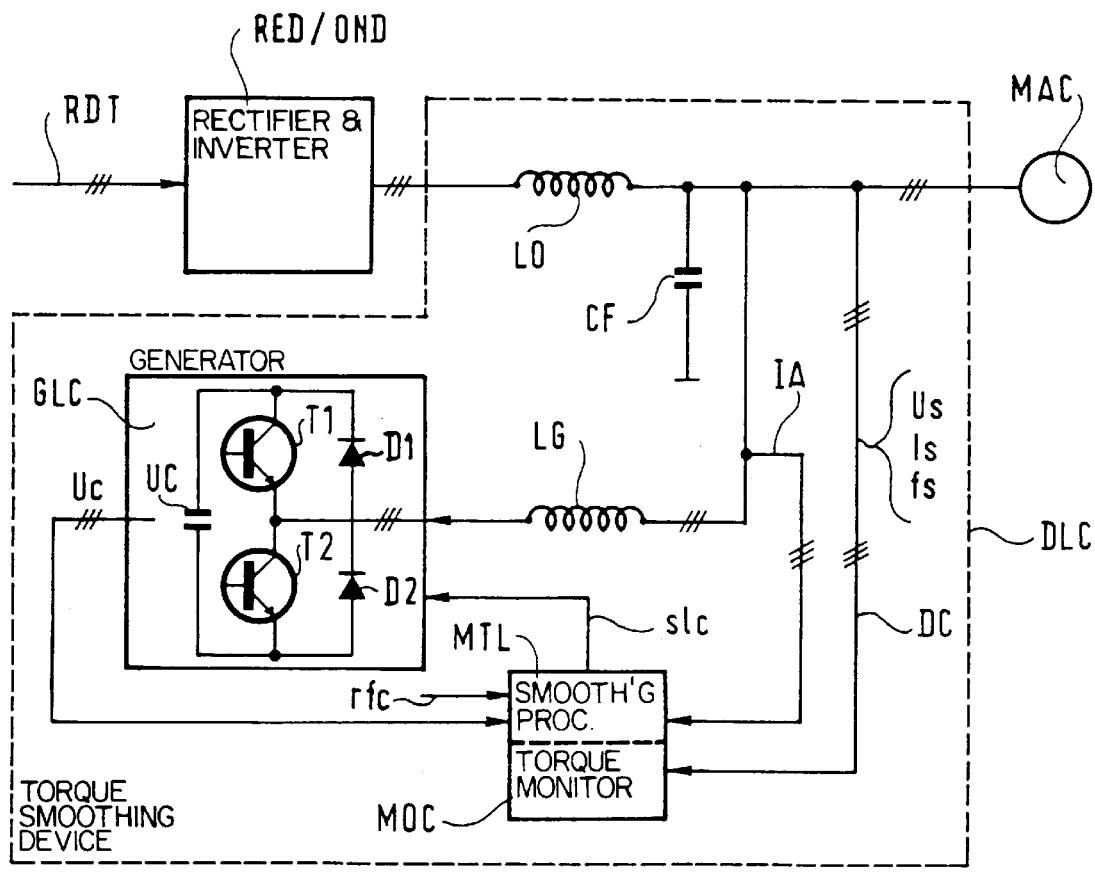
FIG. 3 is a more detailed block schematic of an electric machine control system of the kind shown in FIG. 1.

To this end the device DLC, one embodiment of which is shown in more detail in FIG. 3, is connected to a direct current supply C.

The input of the machine MAC is provided with a filter capacitor CF to eliminate high-frequency components from the converter OND and from the torque smoothing device DLC.

Accordingly, the essence of the invention is that a torque smoothing device, observing that the torque does not conform to a torque reference value, produces a smoothing power that is added to the power supplied to the machine so that the torque of the machine tends to become equal to the torque reference value. The smoothing power in question is already of limited magnitude by virtue of the fact that it constitutes a top-off essentially intended to reduce harmonics; its magnitude is further limited in that it can be restricted to what is necessary at lower speeds of the machine, at which the power supply to the machine is still relatively low.

Figure 2:
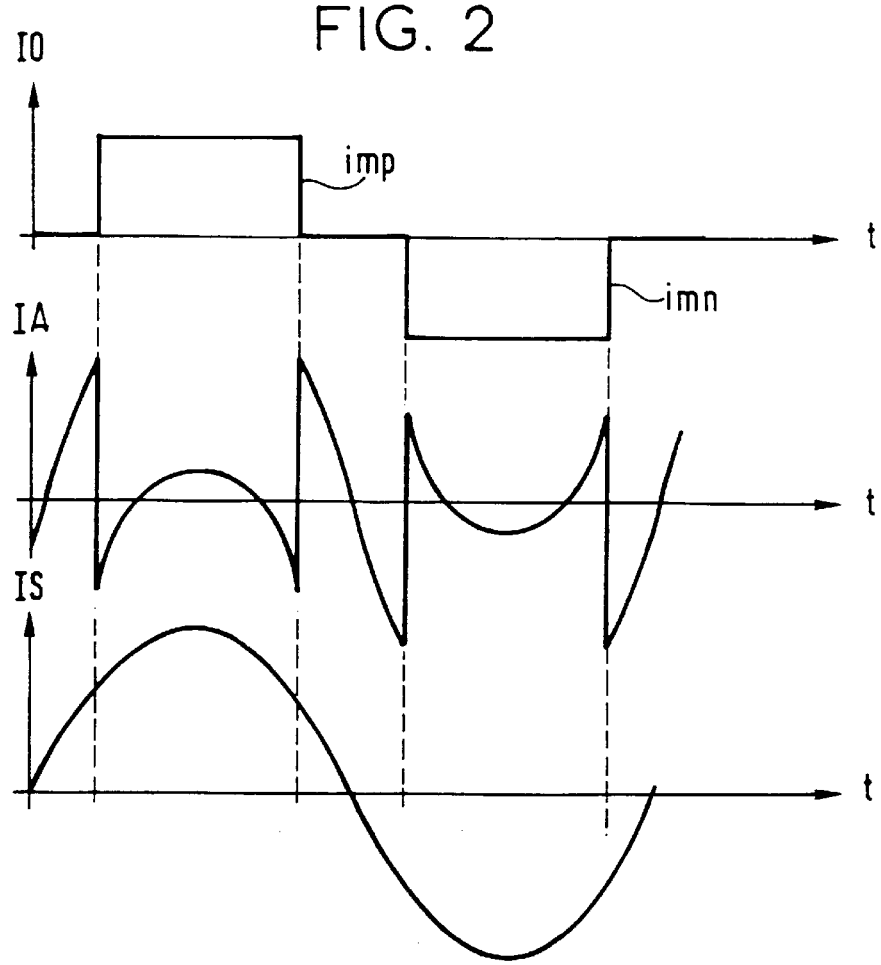
FIG. 2 shows current waveforms illustrating the mode of operation of the control system from FIG. 1.

FIG. 2 shows the currents IO, IA and IS as a function of time t in the simple situation in which the inverter OND provides a signal comprising alternately a positive pulse imp and a negative pulse imn, the figure showing only one period of this alternating current. Applied in this form to the machine MAC, this current would generate vibration due to the harmonics that it contains. The device DLC detects such vibration via the connection DC and, assuming that it contains and applies a torque reference indicating that the torque must be constant, it generates the signal IA having the waveform shown, which is as close as possible to the sum of the harmonics contained in the signal IO. As shown by the direction of the arrow associated with the signal IA, the latter is in fact subtracted from the current IO so that the current IS, as shown, tends to be a sinusoid containing no harmonics and the torque generated by the machine MAC tends to be constant. Within the period, any residual variation in torque therefore tends to be continuously corrected by a concomitant variation of the current IA.

In the foregoing, a representation of power in terms of currents only has been adopted. The person skilled in the art knows how to make the appropriate conversions to allow for voltages.

It will be readily understood that the waveform produced by the inverter OND may be different, in particular in terms of its frequency, its phase or its amplitude. The torque smoothing device DLC will adapt automatically. This emerges more clearly on considering the more detailed embodiment shown in FIG. 3.

FIG. 3 uses the same reference numbers as FIG. 1 for components having the same function. Thus it includes the rectifier REC and the inverter OND from FIG. 1, in a combined unit RED/OND, the inductor LO, the machine MAC, the torque smoothing device DLC, the inductors LO and LG and the capacitor CF.

The torque smoothing device DLC further includes torque monitoring means MOC, torque smoothing processing means MTL, a source of one or more torque references rfc and a torque smoothing generator GLC. These various means may advantageously be embodied in a computer with associated memories.

The connection DC is connected to the input of the machine MAC and by observing the voltage Us, the current Is and the frequency fs (which is deduced from the voltage Us for example) enables calculation of the torque generated by the machine MAC and in particular shows up any irregularity in this torque. This is the function of the means MOC. The processing means MTL receive at least one torque reference rfc which can merely indicate the percentage torque variation authorized over one, two, . . . n periods. Given the history of the operation of the machine (speed increasing or decreasing or stable), this enables modification of the current IA so that the quasi-sinusoidal current IS, whilst minimizing variation in torque over the period, enables a regular and smooth change of speed that is already in progress to be continued. The result is a torque smoothing signal slc transmitted by the means MTL to a torque smoothing generator GLC that can take the form of a three-phase inverter comprising, in a manner that is known in itself, arms each formed of switches T1, T2 and diodes D1, D2 connected to a direct current supply UC. The voltage Uc generated by this generator is transmitted to the processor means MTL, likewise the current IA, enabling it to apply closed loop control, using a technique familiar to the person skilled in the art.

The operation and the results obtained by a system of this kind conform to those described with reference to FIG. 1. Note that the torque of the machine MAC is determined merely by monitoring the supply voltage and current. The monitoring means MOC, even though provided with a sophisticated model of the machine and the installation that it drives, cannot provide an accurate and up to date representation of the torque. This topic is discussed further with reference to the system shown in FIG. 5.

Figure 4:
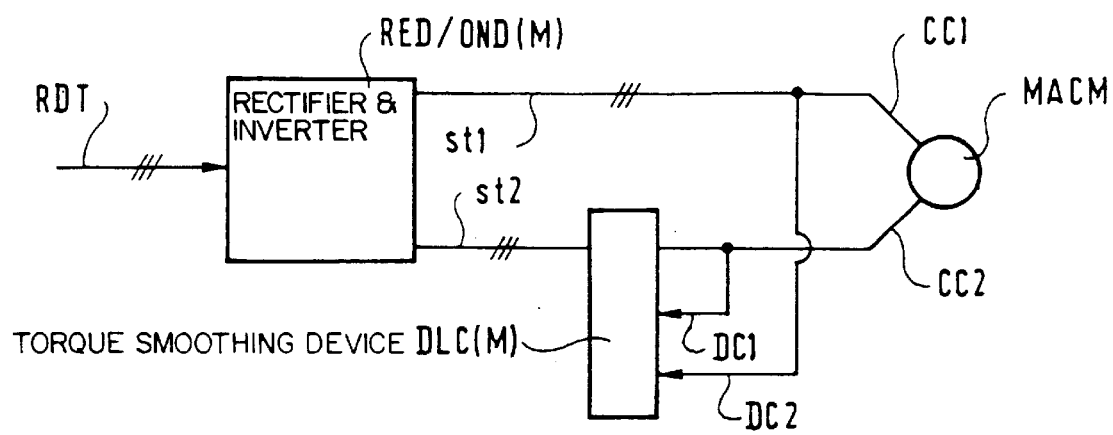
FIG. 4 is a simplified diagram of a system like those of FIGS. 1 through 3 for a machine with a plurality of power supply circuits.

First, with reference to FIG. 4, consider the case of a machine MACM with a plurality of star connections to a three-phase output st1, st2 of a multiple rectifier-inverter RED/OND(M). As can be seen in FIG. 4, the torque smoothing device DLC(M) monitors at DC1, DC2 the various power supply circuits of the machine and is adapted to operate on only one of them, by supplying smoothing power to it.

Figure 5:
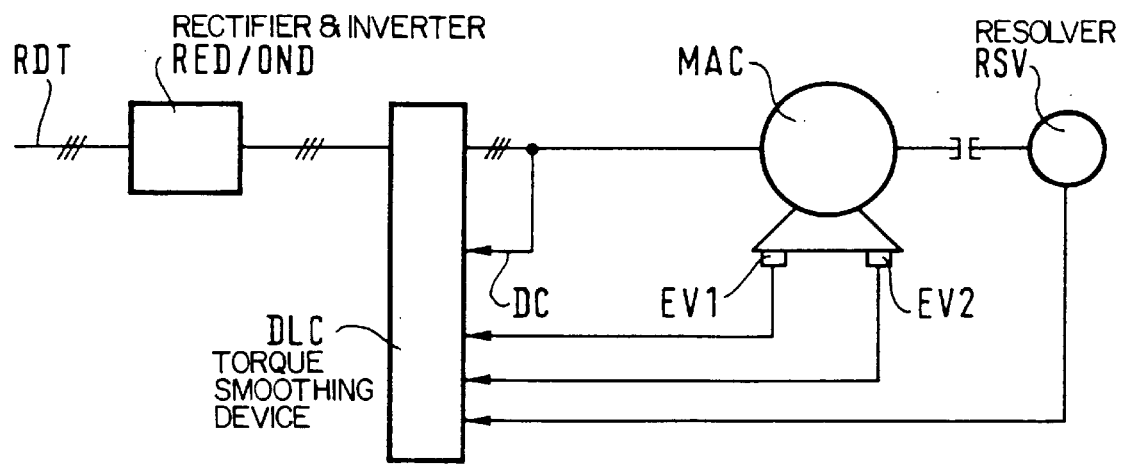
FIG. 5 is a diagram similar to that of FIG. 1 showing a system comprising sensors associated with the electric machine.

FIG. 5, reverting to a configuration like that of FIG. 3, shows a system comprising the same essential components (RDT, RED/OND, DLC, DC, MAC) but in which the device DLC receives not only the magnitudes Us, Is, Fs over the link DC, as previously, but also the output signals of force or vibration sensors EV1, EV2 installed on the supports of the machine MAC and of a resolver RSV on the shaft. The signals indicate variations of torque directly. Similar sensors on the two axes perpendicular to the shaft detect any out-of-balance and the system of the invention thus enables the effects of the latter to be corrected.

Figure 6:
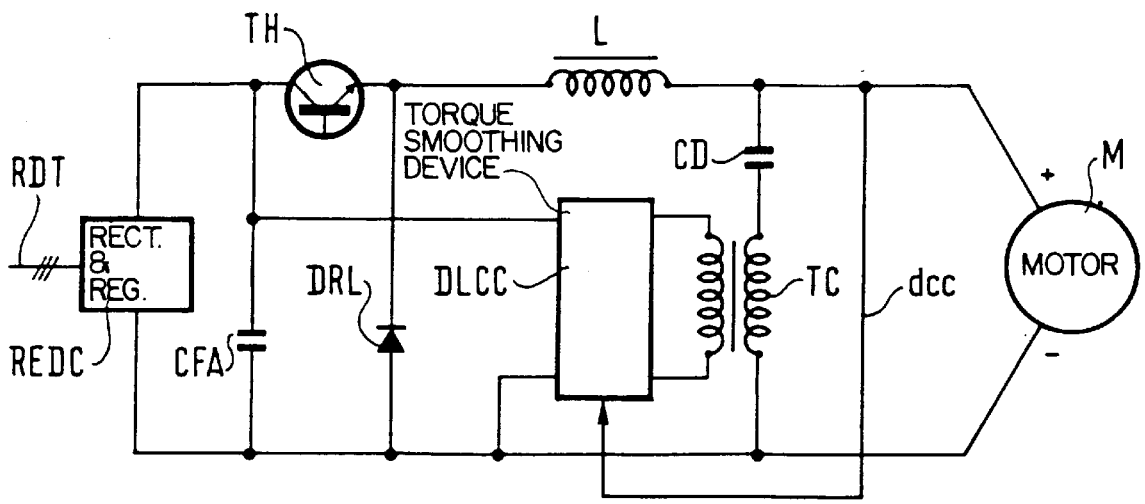
FIG. 6 is a diagram showing a variant of the system from FIG. 1 for a direct current electric machine.

FIG. 6 shows one application of the invention to a direct current motor. It shows, connected to a three-phase supply RDT, a rectifier-regulator REDC supplying a direct current to a motor M via an inductor L. A transistor TH, for example a chopper transistor, regulates the supply current of the motor M. There is an accumulator capacitor CFA on the upstream side of this transistor and a freewheel diode DRL on its downstream side. The DC voltage across the accumulator capacitor CFA powers a torque smoothing device DLCC that receives via a connection dcc an evaluation of the power supply voltage and current of the motor M. The device DLCC, which is similar to the previous torque smoothing devices, is connected by a transformer TC and a decoupling capacitor CD to the motor M to which it supplies a smoothing power to reduce or to control torque variations, as in the systems previously described.

Thus the invention is seen to be equally applicable to direct current motors.

There is claimed:

1. An electric machine control system comprising:

an electric machine, an electrical power supply input connected to said machine, a torque smoothing device including torque monitoring means connected to said machine for supplying torque signals of said machine, a smoothing processor means connected to said torque monitoring means and receiving said torque signals of said machine, said smoothing processor means receiving at least one torque reference signal corresponding to a desired torque output of said electric machine, and a smoothing generator connected to said machine, receiving said smoothing signals and supplying a smoothing power input to said machine to conform the machine torque to said torque reference signal.

2. The electric machine control system claimed in claim 1 wherein said smoothing generator is a power supply converter.

3. The electric machine control system claimed in claim 2 wherein said smoothing generator has an output connected in parallel with at least one power supply circuit of said machine.

4. The electric machine control system claimed in claim 3 wherein said power supply circuit includes an inductor connected in series with said power supply circuit on the upstream side of said parallel connection.

5. The electric machine control system claimed in claim 3 wherein said power supply circuit includes a capacitor connected in parallel with the input of said machine.

6. The electric machine control system claimed in claim 1 wherein said torque monitoring means comprises means for detecting electrical current and voltage supplied to said machine.

7. The electric machine control system claimed in claim 6 wherein said monitoring means also includes means for detecting said smoothing power from said smoothing generator.

8. The electric machine control system claimed in claim 1 wherein said torque monitoring means includes at least one of a force sensor and a vibration sensor associated with said machine.

9. An electric machine control system as claimed in claim 1 wherein said torque smoothing device further includes means for conjointly monitoring a plurality of power supply circuits to said machine and means for supplying said smoothing power to only one of said power supply circuits.

10. A torque smoothing device for an electric machine having an electrical supply input connected to said machine, said device comprising:

torque monitoring means connected to said machine for supplying torque signals of said machine, a smoothing processor means connected to said torque monitoring means and receiving said torque signals of said machine, said smoothing processor means receiving at least one torque reference signal corresponding to desired torque output of said electric machine, and a smoothing generator connected to said machine, receiving said smoothing signals and supplying a smoothing power input to said machine to conform the machine torque to said torque reference signal.

11. The torque smoothing device claimed in claim 10 wherein said smoothing generator is a power supply converter.

12. The torque smoothing device claimed in claim 11 wherein said smoothing generator has an output connected in parallel with at least one power supply circuit of said machine.

13. The torque smoothing device claimed in claim 12 wherein said power supply circuit includes an inductor connected in series with said power supply circuit on the upstream side of said parallel connection.

14. The torque smoothing device claimed in claim 12 wherein said power supply circuit includes a capacitor connected in parallel with the input of said machine.

15. The torque smoothing device claimed in claim 10 wherein said torque monitoring means comprises means for detecting the electrical current and the voltage supplied to said machine.

16. The torque smoothing device claimed in claim 15 wherein said monitoring means also includes means for detecting said smoothing power from said smoothing generator.

17. The torque smoothing device claimed in claim 10 wherein said torque monitoring means includes at least one of a force sensor and a vibration sensor associated with said machine.

* * * * *